(12) United States Patent
Wu et al.

(10) Patent No.: US 7,873,324 B2
(45) Date of Patent: Jan. 18, 2011

(54) APPARATUS AND METHOD FOR E-HICH/E-RGCH PROCESSING, METRIC ESTIMATION AND DETECTION

(75) Inventors: Jun Wu, San Diego, CA (US); Hongwei Kong, Denville, NJ (US); Li Fung Chang, Holmdel, NJ (US)

(73) Assignee: Broadcom Corporation, Irvine, CA (US)

( * ) Notice: Subject to any disclaimer, the term of this patent is extended or adjusted under 35 U.S.C. 154(b) by 606 days.

(21) Appl. No.: 11/962,518

(22) Filed: Dec. 21, 2007

(65) Prior Publication Data

US 2009/0036059 A1 Feb. 5, 2009

Related U.S. Application Data

(60) Provisional application No. 60/963,041, filed on Aug. 1, 2007.

(51) Int. Cl.
  *H04B 17/00* (2006.01)
(52) U.S. Cl. .......... 455/67.13; 455/522; 455/67.11; 455/63.1; 455/226.1; 455/226.2; 455/226.3; 455/296; 375/224; 375/227; 375/346; 370/311; 370/317; 370/318; 370/252

(58) Field of Classification Search .......... 455/522, 455/67.11, 67.13, 63.1, 67.16, 226.1–226.3, 455/296; 375/316, 346, 224, 227; 370/311, 370/317, 318, 241, 241.1, 242, 252, 253
See application file for complete search history.

(56) References Cited

U.S. PATENT DOCUMENTS

| | | | |
|---|---|---|---|
| 6,977,915 B2 * | 12/2005 | Chen et al. ............ | 370/335 |
| 7,116,981 B2 * | 10/2006 | Jeon et al. ............ | 455/450 |
| 7,173,990 B2 * | 2/2007 | Kim et al. ............ | 375/347 |
| 7,269,403 B1 * | 9/2007 | Miao ................... | 455/402 |
| 7,299,011 B2 * | 11/2007 | Penther ................ | 455/67.13 |
| 7,457,366 B2 * | 11/2008 | Maltsev et al. ........ | 375/260 |
| 7,639,660 B2 * | 12/2009 | Kim et al. ............ | 370/343 |

OTHER PUBLICATIONS

3GPP TS 25.211 Technical Specification v6.7.0 (Dec. 2005) (Release 6); 3GPP Organizational Partners; Dec. 2005; pp. 1-50.

\* cited by examiner

*Primary Examiner*—Tuan A Tran
(74) *Attorney, Agent, or Firm*—Garlick Harrison & Markison

(57) ABSTRACT

Apparatus and method for processing a received pilot to obtain noise estimation of a pilot channel and processing a received first signal channel, separately from a second signal channel that is orthogonal to the first signal channel, to obtain a signal level of the first signal channel. The noise estimation and the signal level are used to calculate a SNR value. Detection on the first channel is done by checking the SNR and the sign of a soft metric.

20 Claims, 12 Drawing Sheets

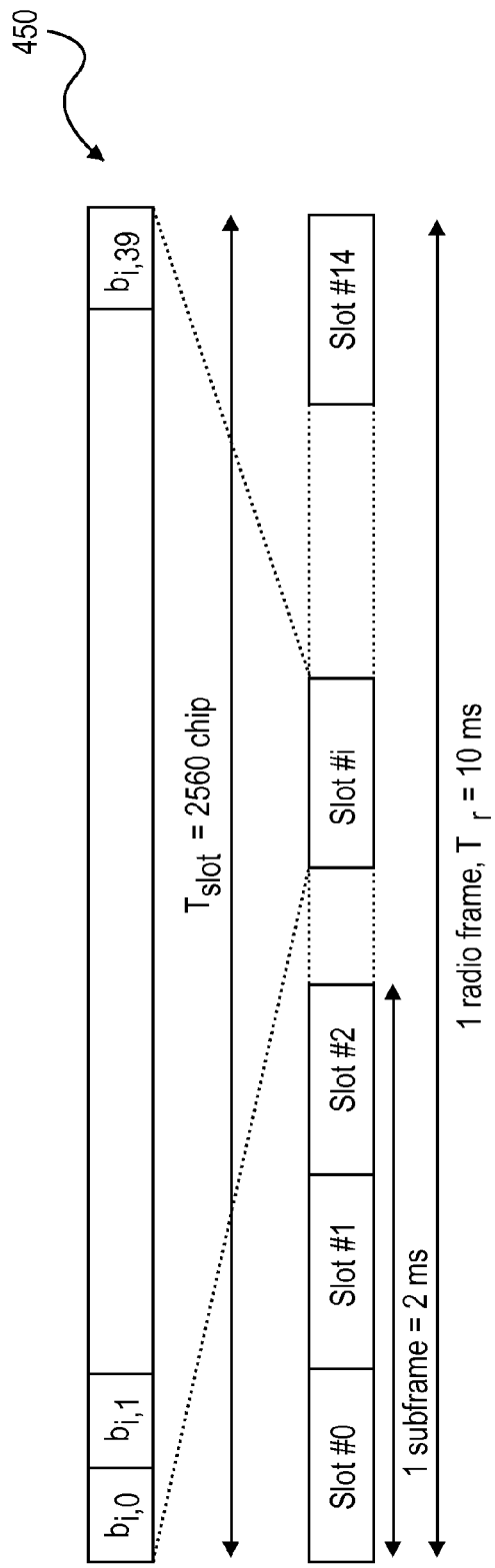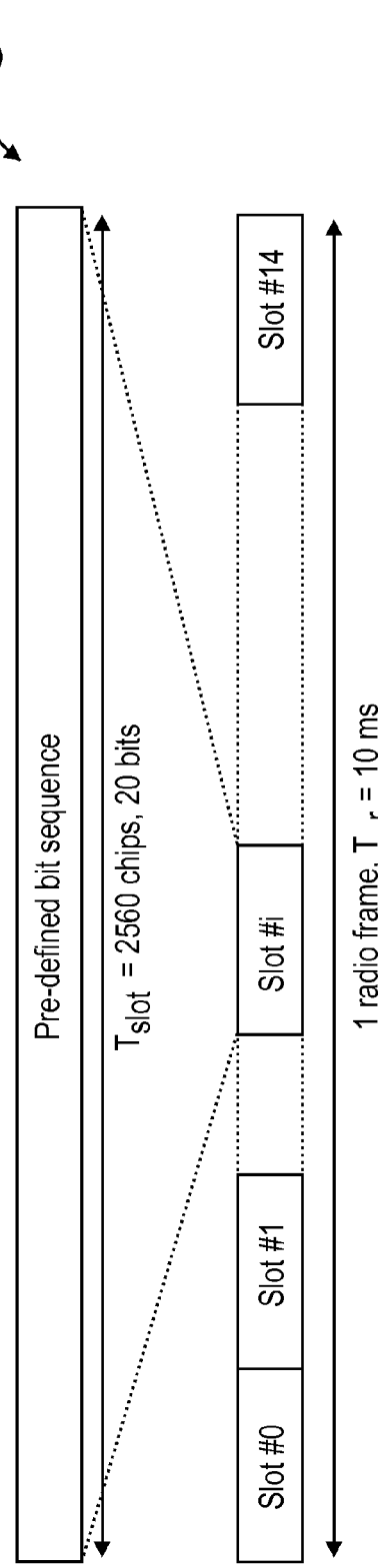
FIG. 5A
FIG. 5B

APPARATUS AND METHOD FOR E-HICH/E-RGCH PROCESSING, METRIC ESTIMATION AND DETECTION

CROSS REFERENCE TO RELATED APPLICATION

This application claims the benefit of priority to U.S. Provisional Patent Application Ser. No. 60/963,041; filed Aug. 1, 2007; and titled "Apparatus and method for E-HICH/E-RGCH processing, metric estimation and detection," which is incorporated herein by reference.

BACKGROUND OF THE INVENTION

1. Technical Field of the Invention

The present invention relates generally to wireless communication systems and, more particularly, to the decoding and processing of certain communication channels in a downlink receiver in such a wireless communication system.

2. Description of Related Art

Mobile communication has changed the way people communicate and mobile phones have been transformed from a luxury item to an essential part of every day life. The use of mobile phones today is generally dictated by social situations, rather than being hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers want technologies that will allow them to increase downlink throughput and, in turn, offer advanced QoS capabilities and speeds that rival those delivered by cable modem and/or DSL service providers. In this regard, networks based on Wideband Code Division Multiple Access (WCDMA) technology may make the delivery of data to end users a more feasible option for today's wireless carriers.

The General Packet Radio Service (GPRS) and Enhanced Data rates for GSM Evolution (EDGE) technologies may be utilized for enhancing the data throughput of present second generation (2G) systems such as GSM. The Global System for Mobile telecommunications (GSM) technology may support data rates of up to 14.4 kilobits per second (Kbps), while the GPRS technology may support data rates of up to 115 Kbps by allowing up to 8 data time slots per time division multiple access (TDMA) frame. The GSM technology, by contrast, may allow one data time slot per TDMA frame. The EDGE technology may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The Universal Mobile Telecommunications System (UMTS) technology with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The High Speed Downlink Packet Access (HSDPA) technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology supports 16-level Quadrature Amplitude Modulation (16-QAM) over a high-speed downlink shared channel (HS-DSCH), which permits a plurality of users to share an air interface channel.

In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by one of the world's most popular mobile technology. HSDPA may offer breakthrough advances in WCDMA network packet data capacity, enhanced spectral and radio access networks (RAN) hardware efficiencies, and streamlined network implementations, plus others. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and drive the consumption of data-heavy services, while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation and 3.6 Mbit/s and up with 16-QAM modulation. The highest capability class supports the maximum theoretical bit rate of 14.4 Mbit/s.

Where HSDPA is a downlink protocol, High Speed Uplink Packet Access (HSUPA) technology addresses the uplink communication. HSUPA is also specified by the 3GPP group to provide a complement data link to HSDPA. HSUPA also offers broadband IP and is based on software. HSUPA also extends the WCDMA bit rates, but the uplink rates may be less than the downlink rates of HSDPA. Where prior protocols severely limited the uplink connections, HSUPA allows for much higher uplink rates.

With the advent of HSUPA/HSDPA technology, a number of new, as well as existing, communication channels are specified under the 3GPP telecommunication standard. For example, Release 6 version of the 3GPP standard has identified three downlink channels that convey information to the downlink receiver, typically referred to as User Equipment (UE). The three channels are known as E-AGCH, E-HICH and E-RGCH. E-AGCH uses orthogonal spreading code and is orthogonal to E-HICH and E-RGCH. E-HICH and E-RGCH may use the same orthogonal spreading code, but each employs an orthogonal signature sequence spanning three time slots to differentiate one from the other. Therefore the three channels are still mutually orthogonal to one another.

E-HICH and E-RGCH transmit 3 levels where two levels are represented by an antipodal signal and the third is represented by zero amplitude. To detect the zero amplitude state, amplitude information in terms of E-HICH channel power and E-RGCH channel power, as well as noise power are necessary.

Accordingly, it would be advantageous to detect the orthogonal channels separately and have the power levels for the code channel and the noise estimated for each channel based on the individual channel signal reception.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

BRIEF DESCRIPTION OF THE DRAWINGS

FIG. 5A shows a frame structure for E-HICH/E-RGCH channels based on a 3GPP standard.

FIG. 5B shows a frame structure for CPICH pilot channel based on the 3GPP standard.

DETAILED DESCRIPTION OF THE EMBODIMENTS OF THE INVENTION

The embodiments of the present invention may be practiced in a variety of settings that utilize a wireless communication receiver. The specific embodiments described below pertain to communication channels associated with a $3^{rd}$ Generation Partnership Project (3GPP) telecommunication technology and, in particular, HSDPA/HSUPA technology associated with WCDMA. However, the invention need not be limited to such applications and other embodiments of the invention may be implemented in other communications protocols and standards. Furthermore, the invention is not limited for use with WCDMA only and may be used in many other wireless technologies as well.

Figure 1:
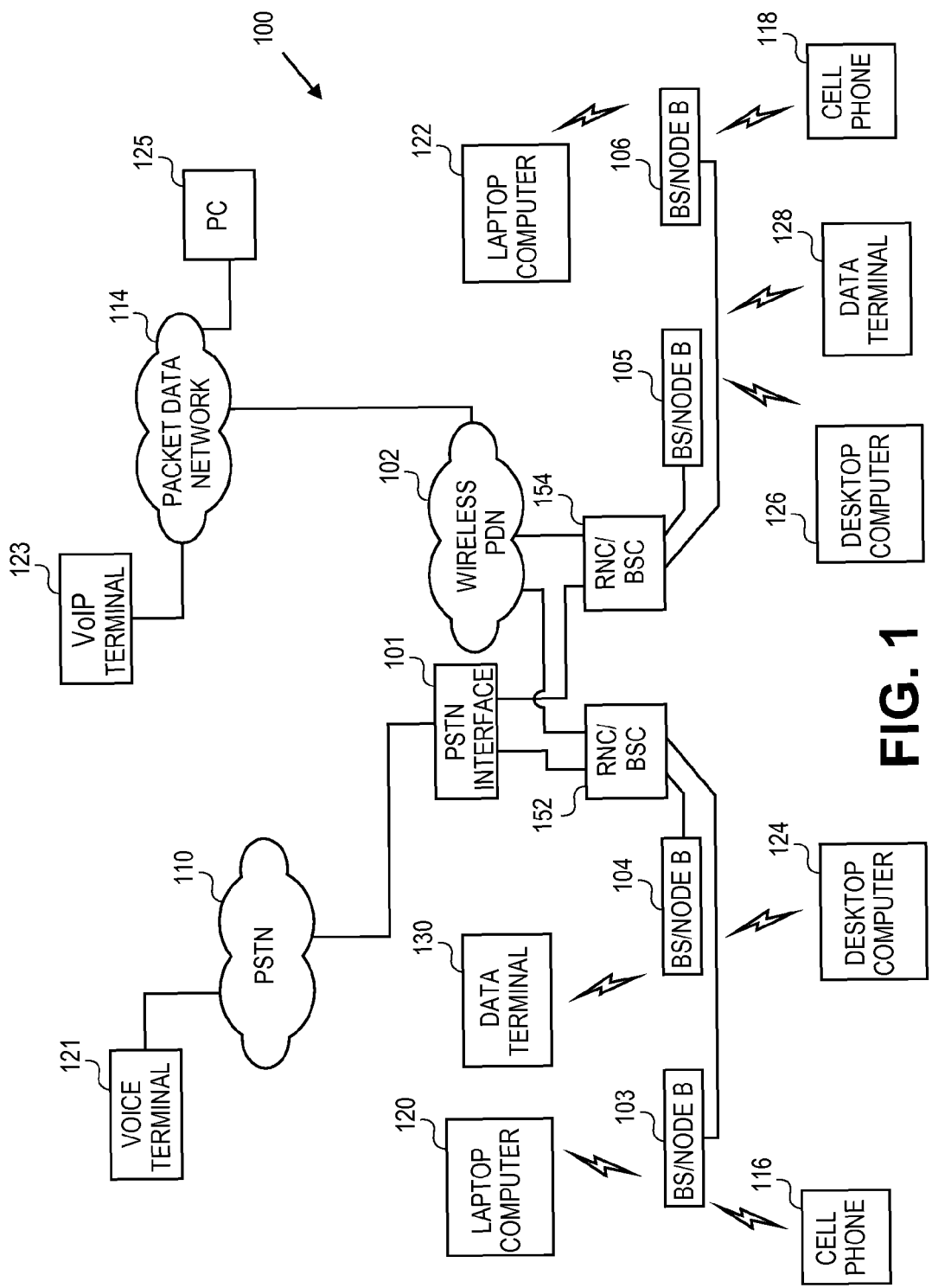
FIG. 1 is a system diagram showing a portion of a cellular wireless communication system that supports wireless devices operating according to a practice of the present invention.

FIG. 1 is a system diagram illustrating a portion of a cellular wireless communication system 100 that supports wireless terminals operating according to the practice of the invention. The cellular wireless communication system 100 includes a Public Switched Telephone Network (PSTN) interface 101 (such as a Mobile Switching Center), a wireless Packet Data Network (PDN) 102 (that may include GPRS Support Nodes, EDGE Support Nodes, WCDMA Support Nodes, and other components), Radio Network Controllers/Base Station Controllers (RNC/BSCs) 152 and 154, and base stations (BSs) 103, 104, 105, and 106, each of which are also referred to as Node B. The wireless network PDN 102 may be coupled to private and public packet data network 114, such as the Internet, WANs, LANs, etc. A conventional voice terminal 121 couples to a PSTN 110. A Voice over Internet Protocol (VoIP) terminal 123 and a personal computer (PC) 125 are shown coupled to the network 114. The PSTN Interface 101 may couple to a PSTN 110. Of course, this particular structure may vary from system to system and the particular system 100 is shown as an example only.

Each of the BS/Node Bs 103-106 services a cell or set of sectors within which it supports wireless communications. Wireless links that include both downlink components and uplink components support wireless communications between the base stations and their serviced wireless terminals. These wireless links support digital data communications, VoIP communications, and other digital multimedia communications. The cellular wireless communication system 100 may also be backward compatible in supporting analog operations as well. Cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc. System 100 may also support one or more versions or "Releases" of the $3^{rd}$ Generation Partnership Project (3GPP) telecommunication technology.

FIG. 1 also shows wireless terminals 116, 118, 120, 122, 124, 126, 128, and 130 coupled to cellular wireless communication system 100 via wireless links with base stations 103-106. As illustrated, wireless terminals may include cellular telephones 116 and 118, laptop computers 120 and 122, desktop computers 124 and 126, and data terminals 128 and 130. However, cellular wireless communication system 100 may support communications with other types of wireless terminals and devices as well. Devices such as laptop computers 120 and 122, desktop computers 124 and 126, data terminals 128 and 130, and cellular telephones 116 and 118, are typically enabled to "surf" the Internet, transmit and receive data communications such as email and text messaging, transmit and receive files, and to perform other data operations. Many of these data operations have significant download (downlink) data-rate requirements while the upload (uplink) data-rate requirements are not as severe. Some or all of wireless terminals 116-130 are therefore enabled to support the EDGE operating standard, the GPRS standard, the UMTS/WCDMA standards, the GSM standard and/or the 3GPP standard.

Figure 2:
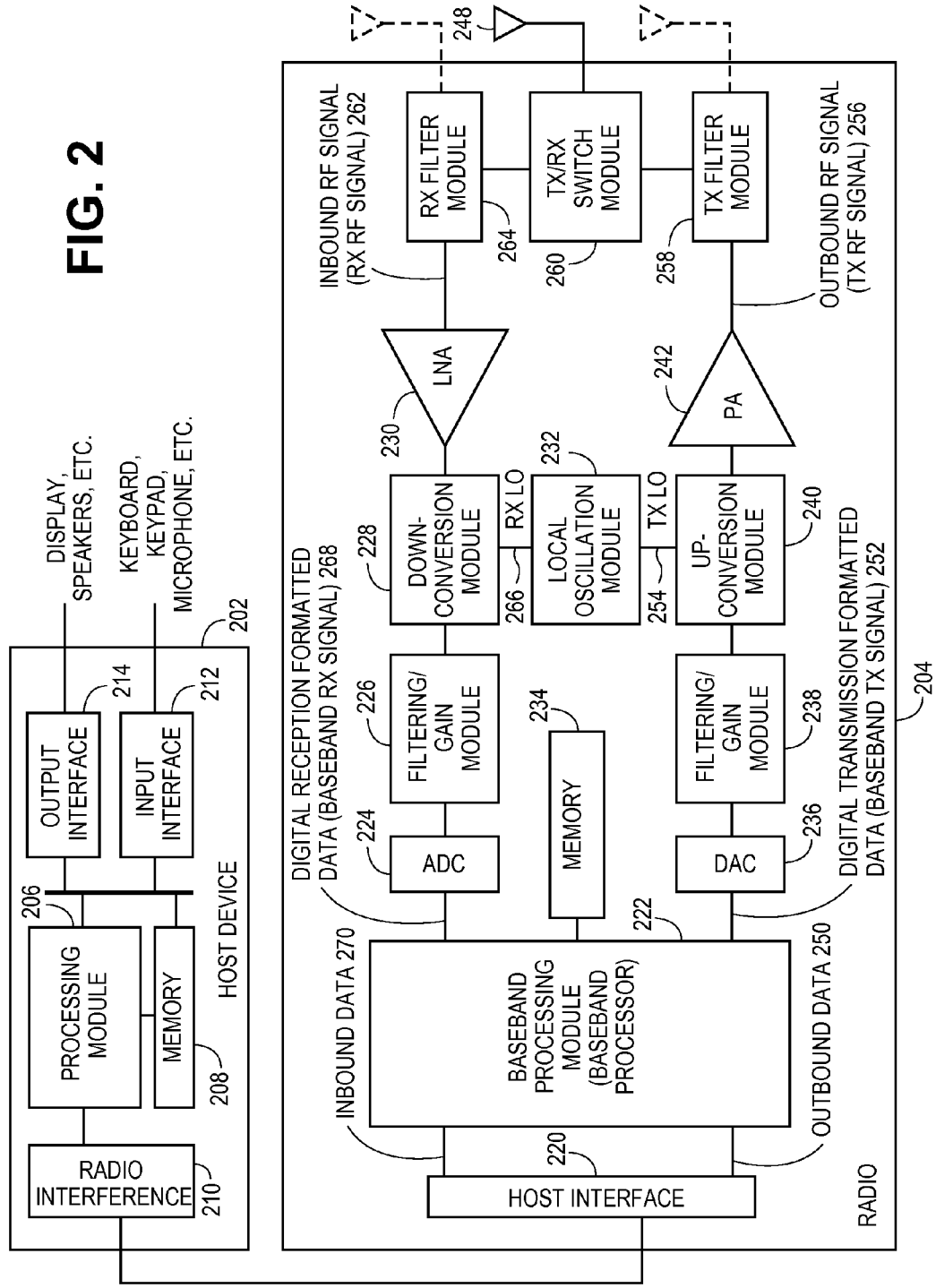
FIG. 2 is a circuit block diagram showing one embodiment of a wireless device for practicing the present invention.

FIG. 2 is a schematic block diagram illustrating a wireless terminal that includes host processing components of a host device 202 and an associated radio 204. For cellular telephones, the host processing components of host device 202 and the radio are contained within a single housing. In some cellular telephones, the host processing components and some or all of the components of radio 204 are formed on a single Integrated Circuit (IC). For personal digital assistants hosts, laptop hosts, and/or personal computer hosts, radio 204 may reside within an expansion card and, therefore, reside separately from the host 202. The host processing components of host 202 may include a processing module 206, memory 208, radio interface 210, an input interface 212, and an output interface 214. Processing module 206 and memory 208 execute instructions to support host terminal functions. For example, for a cellular telephone host device, processing module 206 performs user interface operations and executes host software programs among other operations. Furthermore, as noted in FIG. 2, the host device may include or be coupled to one or more user interfaces (such as displays, speakers, headphones, keyboards, keypads, microphones, etc.).

Radio interface 210 allows data to be received from and sent to radio 204. For data received from radio 204 (e.g., inbound data), radio interface 210 provides the data to processing module 206 for further processing and/or routing to output interface 214. Output interface 214 provides connectivity to one or more output display devices. Radio interface 210 also provides data from processing module 206 to radio 204. Processing module 206 may receive the outbound data from one or more input device via input interface 212 or generate the data itself For data received via input interface 212, the processing module 206 may perform a corresponding host function on the data and/or route it to radio 204 via radio interface 210.

Radio 204 includes a host interface 220, baseband (BB) processing module 222 (baseband processor) 222, analog-to-digital converter (ADC) 224, filtering/gain module 226, down conversion module 228, low noise amplifier (LNA) 230, local oscillation module 232, memory 234, digital-to-analog converter (DAC) 236, filtering/gain module 238, up-conversion module 240, power amplifier (PA) 242, RX filter module 264, TX filter module 258, TX/RX switch module 260, and antenna 248. Antenna 248 may be a single antenna that is shared by transmit and receive paths or may include separate antennas for the transmit path and the receive path. The antenna implementation may depend on the particular standard to which the wireless communication device is compliant.

Baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding,. The digital transmitter functions include, but are not limited to, encoding, scrambling, constellation mapping, modulation, and/or digital baseband to IF conversion. The transmit and receive functions provided by baseband processing module 222 may be implemented using shared processing devices and/or individual processing devices. Processing devices may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. Memory 234 may be a single memory device or a plurality of memory devices. Such a memory device may be a read-only memory, random access memory, volatile memory, non-volatile memory, static memory, dynamic memory, flash memory, and/or any device that stores digital information. Note that when baseband processing module 222 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 204 receives outbound data 250 from the host processing components via host interface 220. Host interface 220 routes outbound data 250 to baseband processing module 222, which processes outbound data 250 in accordance with a particular wireless communication standard (e.g., UMTS/WCDMA, GSM, GPRS, EDGE, 3GPP, et cetera) to produce digital transmission formatted data 252. Digital transmission formatted data 252 is a digital base-band signal or a digital low IF signal.

Digital-to-analog converter 236 converts digital transmission formatted data 252 from the digital domain to the analog domain. Filtering/gain module 238 filters and/or adjusts the gain of the analog signal prior to providing it to up-conversion module 240. Up-conversion module 240 directly converts the analog baseband or low IF signal into an RF signal based on a transmitter local oscillation signal (TX LO) 254 provided by local oscillation module 232. Power amplifier 242 amplifies the RF signal to produce outbound RF signal 256, which is filtered by TX filter module 258. TX/RX switch module 260 receives the amplified and filtered RF signal from TX filter module 258 and provides output RF signal 256 signal to antenna 248, which transmits outbound RF signal 256 to a targeted device, such as to one of base stations 103-106 of FIG. 1.

Radio 204 also receives an inbound RF signal 262, which was transmitted by a base station via antenna 248, TX/RX switch module 260, and RX filter module 264. Low noise amplifier 230 receives inbound RF signal 262 and amplifies inbound RF signal 262 to produce an amplified inbound RF signal. Low noise amplifier 230 provides the amplified inbound RF signal to down conversion module 228, which converts the amplified inbound RF signal into an inbound low IF signal or baseband signal based on a receiver local oscillation signal (RX LO) 266 provided by local oscillation module 232. Down conversion module 228 provides the inbound low IF signal (or baseband signal) to filtering/gain module 226, which filters and/or adjusts the gain of the signal before providing it to analog to digital converter 224.

Analog-to-digital converter 224 converts the filtered inbound low IF signal (or baseband signal) from the analog domain to the digital domain to produce digital reception formatted data 268. Baseband processing module 222 demodulates, demaps, descrambles, and/or decodes the digital reception formatted data 268 to capture inbound data 270 in accordance with the particular wireless communication standard being implemented by radio 204. Host interface 220 provides inbound data 270 to the host processing components of host device 202 via radio interface 210.

Figure 3:
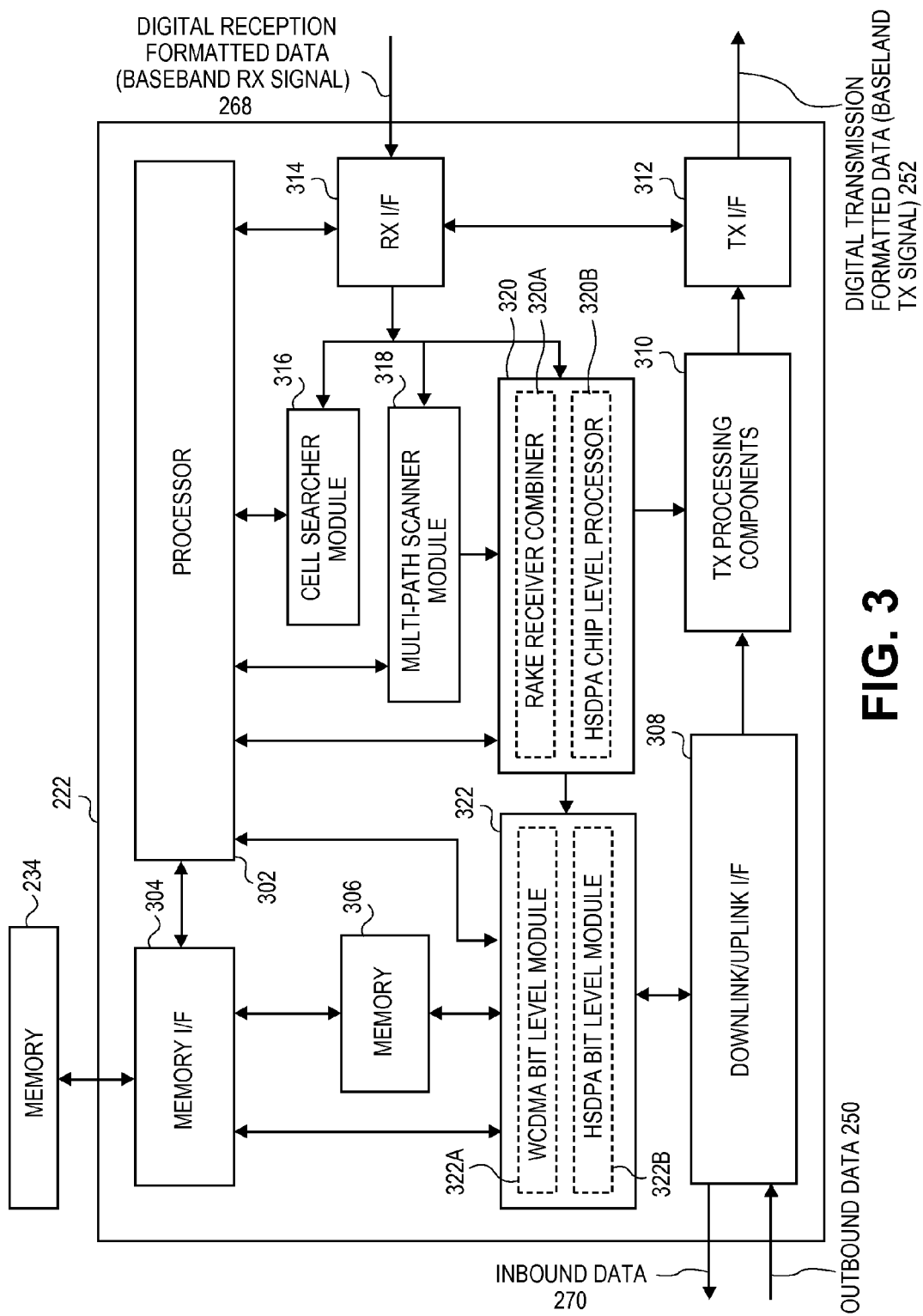
FIG. 3 is a block diagram illustrating components of a baseband processing module according to an embodiment of the present invention.

FIG. 3 is a block diagram illustrating one embodiment for baseband processing module 222 of FIG. 2. Components of baseband processing module (baseband processor) 222 include a processor 302, a memory interface 304, onboard memory 306, a downlink/uplink interface 308, TX processing components 310, and a TX interface 312. Baseband processing module 222 further includes an RX interface 314, a cell searcher module 316, a multi-path scanner module 318, a chip level processing module 320, and a bit level processing module 322.

Chip level processing module 320 includes a rake receiver combiner 320A that generally supports WCDMA receive processing operations and a HSDPA chip level processing module 320B that generally supports HSDPA receive processing operations. Bit level processing module 322 includes a WCDMA bit-level processing module 322A that supports WCDMA bit-level operations and a HSDPA bit-level processing module 322B that supports HSDPA bit-level operations.

In some embodiments, baseband processing module 222 couples to external memory 234. However, in other embodiments, memory 306 may fulfill the memory requirements of baseband processing module 302. According to some aspects of the present invention, memory 306 is cacheable while memory 234 is non-cacheable. Of course, in other embodiments, memory 234 may also be cacheable. As was previously described with reference to FIG. 2, baseband processing module 222 receives outbound data 250 from coupled host processing components 202 and provides inbound data 270 to the coupled host processing components 202. Further, baseband processing module 222 provides digital formatted transmission data (baseband TX signal) 252 to a coupled RF front end. Baseband processing module 222 receives digital reception formatted data (baseband RX signal) 268 from the coupled RF front end. As was previously described with reference to FIG. 2, an ADC 222 produces the digital reception formatted data (baseband RX data) 268 while DAC 236 of the RF front end receives the digital transmission formatted data (baseband TX signal) 252 from baseband processing module 222.

According to one particular embodiment of the present invention, the downlink/uplink interface 308 is operable to receive the outbound data 250 from coupled host processing components, e.g., the host processing component 202 via host interface 220. Further, the downlink/uplink interface 308 is operable to provide inbound data 270 to the coupled host processing components 202 via host interface 220. Baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, baseband processing module 222 and the host processing components 202 may be formed on a separate integrated circuit. Many differing integrated circuit constructs are possible without departing from the teachings of the present invention.

TX processing components 310 and TX interface 312 couple to the RF front end as illustrated in FIG. 2 and to downlink/uplink interface 308. TX processing components 310 and TX interface 312 are operable to receive the outbound data from downlink/uplink interface 304, to process the outbound data to produce baseband TX signal 252 and to output baseband TX signal 252 to the RF front end as was described with reference to FIG. 2.

RX processing components, including cell searcher module 316, multi-path scanner module 318, chip level processing module 320, and in some cases processor 302, are operable to receive the RX baseband signal 268 from the RF front end as processed by RX I/F 314. Generally, RX I/F 314 produces soft symbols representing the digital reception formatted data 268 in a format suitable for use by these components. HSDPA chip level processing module 320B is operable to produce soft symbols output for use by processing module 322 for further processing, such as turbo coding.

Figure 4:
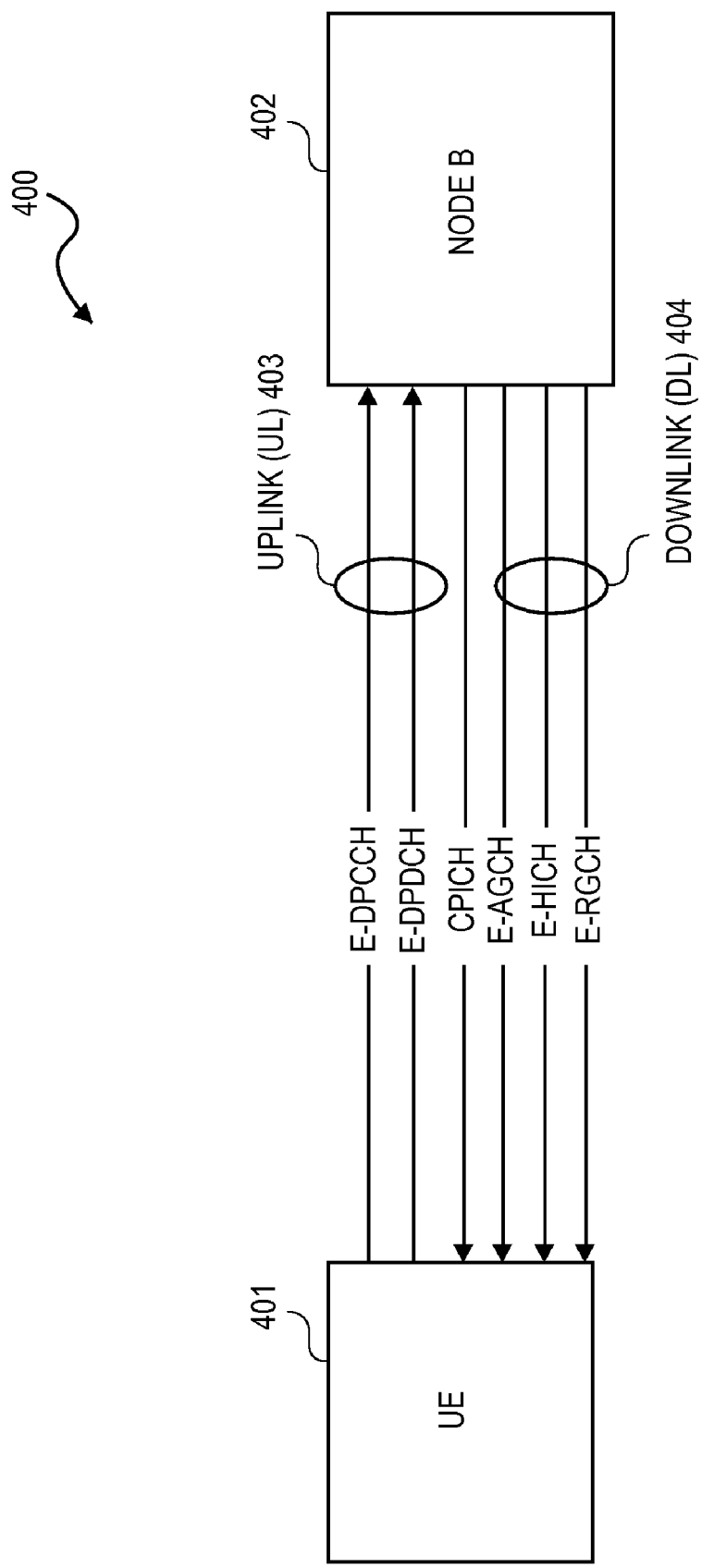
FIG. 4 is a diagram showing a radio link between a UE and Node B, in which certain channels used for wireless communication are depicted.

FIG. 4 shows a diagram of a radio link 400 between a User Equipment (UE) 401 and Node B 402. UE 401 may be one of a variety of devices used for wireless communications. UE 401 may be one of the wireless terminals noted in FIG. 1. Node B 402 may be one of a variety of devices used for wireless communications. Node B 402 may be may be one of the BS/Node Bs noted in FIG. 1. UE 401 and/or Node B may implement part of or all of the components, modules, devices, circuits noted in FIG. 2 and/or FIG. 3.

UE 401 and Node B 402 may communicate using one or more communication protocols or standards, in which communication is achieved by establishing a downlink (DL) and/or uplink (UL) channel(s) for control signal and data transfer, including the use of HSDPA/HSUPA technology. Although various communication standards and protocols may be used, the particular radio link 400 is shown employing a 3GPP standard. In particular, one of the Releases of 3GPP defines a set of dedicated channels. Release 6 of 3GPP, for example, identifies an Enhanced Dedicated Channels (E-DCH). Two uplink E-DCH channels 403 are identified as E-DCH Dedicated Physical Control Channel (E-DPCCH) and E-DCH Dedicated Physical Data Channel (E-DPDCH). Three downlink E-DCH channels 404 are identified as E-DCH Absolute Grant Channel (E-AGCH), E-DCH Relative Grant Channel (E-RGCH) and E-DCH Hybrid ARQ Indicator Channel (E-HICH), where ARQ stands for Automatic Repeat-reQuest.

Uplink E-DPCCH is used to carry control information generated at Layer 1 for E-DPDCH. E-DPDCH is used to carry the E-DCH transport channel (e.g. data). There may be zero, one or several uplink E-DPDCH on each radio link.

On the downlink, E-AGCH is used to set the absolute power level limit for the E-DPDCH for UE 401 to control the data rate that can be achieved over E-DCH. This is done infrequently to set the E-DPDCH transmit power limit of UE 401 to operate within a particular cell, such as a HSDPA/ HSUPA serving cell. For example, a 6-bit command signal may set the initial transmit power level limit for E-DPDCH of UE 401. Once the initial power level limit is set, E-RGCH is used to adjust the power level limit of UE 401 in incremental levels. For example, a relative grant signal may have three states (+1, 0, −1), in which +1 increases the current power level limit by one step, −1 decreases the current power level limit by one step and 0 maintains the current power level limit. Thus, E-RGCH is used more frequently to adjust the UE power level limit on E-DPDCH once the initial power limit settings are established. The grant value '0' corresponds to a no transmission, or transmission with zero amplitude on the E-RGCH channel. Therefore, at the UE 401 receiver, the detection of E-RGCH needs to differentiate three levels. The 0 level is differentiated from the 1 or −1 via different amplitude or SNR, while the 1 is differentiated from the −1 by the sign of the soft metric.

E-HICH is a fixed rate dedicated downlink physical channel carrying the uplink E-DCH Hybrid ARQ acknowledgement indicator. Essentially, E-HICH carries an acknowledgement (ACK) or no acknowledgement (NAK) signal to inform UE 401 if the transmitted information from UE 401 was received and passes or fails a cyclic redundancy check (CRC), respectively, or nothing is sent on E-HICH if no E-DPCCH is received on the uplink by Node B 402. It is to be noted that this third state associated with the ACK/NAK signal, which may be a zero state where there is no ACK or NAK sent by Node B 402, is to be detected by UE 401 as well. Therefore, the detection for E-HICH is similar to that of the E-RGCH.

One other channel noted in FIG. 4 is a common downlink channel referred to as a Common Pilot Channel (CPICH), which is a fixed rate physical channel that carries a pre-defined bit sequence. When transmit diversity is used on any downlink channel in a cell, CPICH is transmitted from both antennas using the same channelization and scrambling code. However, the pre-defined bit sequence of the CPICH is different for antenna 1 and antenna 2.

In operation, Node B 402 generally controls the transmitted power limit of the E-DPDCH of UE 401 by transferring commands through E-AGCH and E-RGCH. E-HICH is used to convey the ACK/NAK handshake from Node B 402 to UE 401. To achieve reliable detection of the E-RGCH and E-HICH at UE 401, the detection algorithm differentiates three states transmitted on both channels. The differentiation between 1 and −1 may be done by the sign of the soft symbol, but the differentiation of 0 from either 1 or −1 is to be based on the detected power level of E-HICH and E-RGCH. Since the AGC output at ULE 401 does not reflect the true interference level due to orthogonal channels from the same scrambling code, detecting the power level of E-HICH or E-RGCH is not sufficient. The corresponding noise level is estimated and the SNR is used as the metric for differentiating the 0 value from 1 and −1.

Since E-AGCH is used infrequently, the example embodiment described below pertains to the detection and processing of E-HICH and E-RGCH signals in a receiver separately to obtain signal strength measurements. The E-HICH and E-RGCH signal strength indications are obtained by determining individual signal SNR for E-HICH and E-RGCH by detecting, processing and calculating a signal for each of E-HICH and E-RGCH and comparing the signal to a corresponding noise estimation.

As described below, SNR determination for E-HICH and SNR determination for E-RGCH are obtained by detecting the noise level of a pilot channel, such as CPICH, and determining the signal level for each of the orthogonal channels, such as E-HICH and E-RGCH, separately. A SNR value is then determined for each channel to derive the actual signal power level for E-HICH and E-RGCH.

An example slot and frame 440 for E-HICH and E-RGCH is shown in FIG. 5A. Note that E-HICH and E-RGCH may have different frame length, although the same frame format. Frame 450 is 10 msec in duration with 15 slots (slot #0-#14), in which three slots form a subframe of 2 msec in duration. In the particular example, frame 450 has a chip rate of 2560 per slot. For E-RGCH, each slot has a ternary value (+1, 0, −1). The ternary value controls an increase or decrease in the power step or maintain the current power level limit for E-DPDCH. The ternary value is used to modulate a 40-bit signature sequence, so that E-HICH and E-RGCH are made orthogonal to each other. Likewise, E-HICH has a similar slot and frame 450 to convey an ACK or NAK indication. A third state is noted when neither an ACK nor a NAK is sent from NODE B 402 in reply to a UE transmission. Such a third state may correspond to a discontinuous transmission (DTX) state. Accordingly, three states are defined for E-RGCH that need to be detected at the UE and three states are to be detected for E-HICH. In the case where Node B cell is a non-serving E-DCH cell, two states need to be detected for E-RGCH (0 or −1) and E-HICH (ACK, DTX).

An example slot and frame 460 for CPICH is shown in FIG. 5B. The CPICH frame also has 15 slots and is 10 ms in duration. For each slot, a pre-defined bit sequence is transmitted from Node B 402. As noted above, the sequences are different for Node B antenna 1 and antenna 2 when transmit diversity is utilized.

Figure 6:
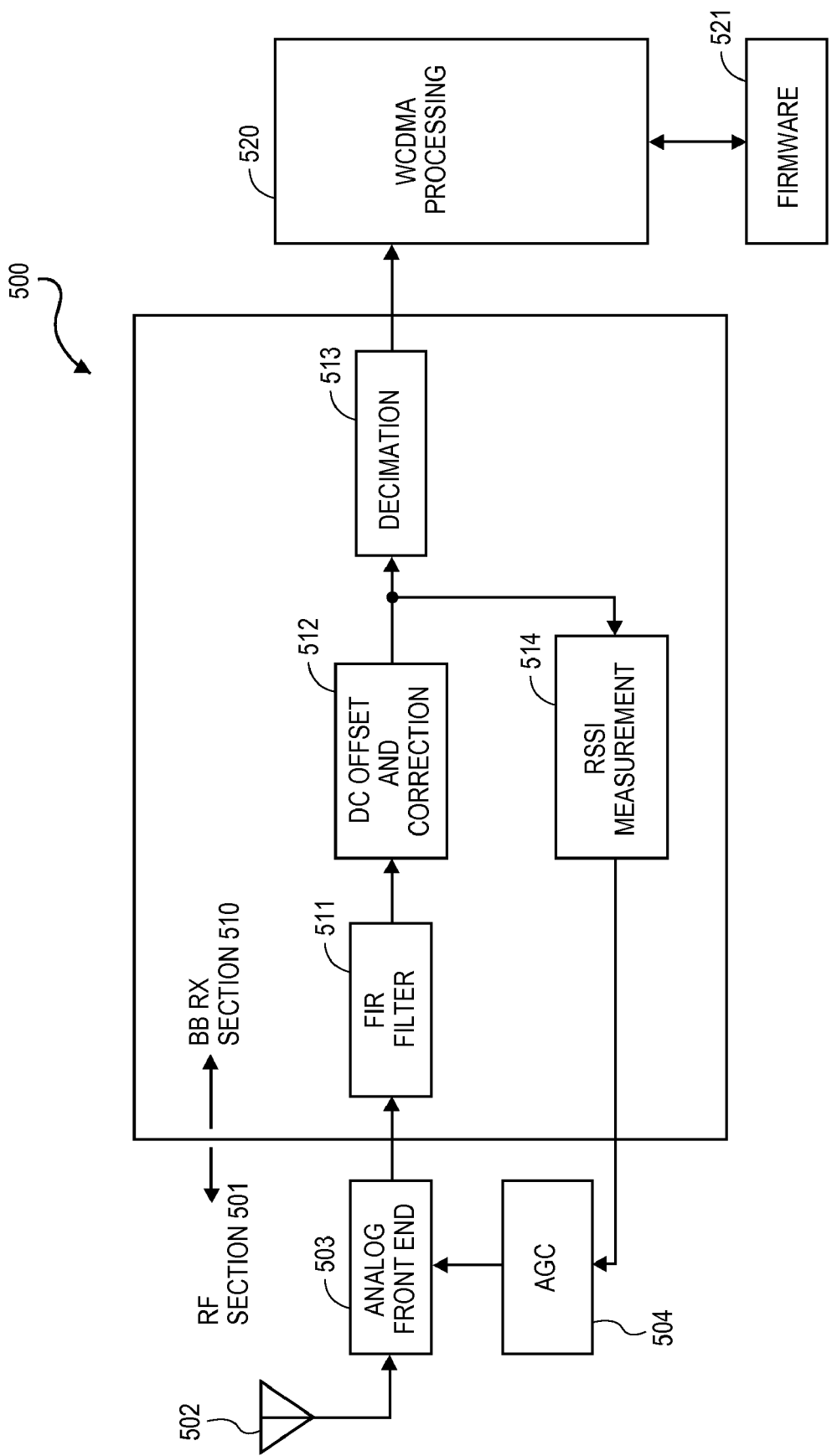
FIG. 6 is a block diagram of a receiver portion of a wireless communication device used to practice an embodiment of the invention.

FIG. 6 shows one example embodiment of a receiver portion of UE 401. A receiver 500 receives signals of the aforementioned E-AGCH, E-HICH, E-RGCH and CPICH at antenna 502 and couples the radio frequency (RF) signals to analog front end 503. RF section 501 of receiver 500 may employ other front end sections and is not limited to the shown analog front end 503. Converted output from analog front end 503 is then coupled to a receiver section of a baseband processing module (BB RX) 510 for baseband processing. BB RX 510 includes a finite-impulse-response (FIR) filter 511, DC offset and correction module 512 and decimation module 513 to perform baseband processing of the received signal. A RSSI measurement module 514 is also included to provide received signal strength indication to automatic gain control (AGC) module 504, which is part of RF section 501. Radio 204 of FIG. 2 may be readily implemented for RF and BB RX sections 501, 510. Baseband processing module 222 of FIG. 3 may also be incorporated as part of receiver 500. It is to be noted that a variety of designs may be implemented for receiver 500.

Output from BB RX 510 is coupled to WCDMA processing module 520 for further WCDMA signal processing with conjunction with processing firmware 521. In one embodiment, WCDMA processing module 520 and firmware 521 reside within a host, such as host device of FIG. 2. In other implementations, WCDMA processing module 520 and/or firmware 521 may reside within baseband processing module 222. Module 520 may reside elsewhere as well. In the particular example shown in FIG. 6, WCDMA processing module 520 and firmware 521 reside in baseband processing module 222.

In a typical practice, AGC is used to control the strength level of a received signal in RF section 501. However, as noted above, orthogonal channels (such as E-AGCH, E-HICH and E-RGCH) present complications since the other orthogonal channels do not register as a component of signal or noise, such that RSSI/AGC alone may not provide accurate power control. Accordingly, in practice of the embodiments of the present invention, separate individual channel SNR calculations are made for the orthogonal channels E-HICH and E-RGCH. The SNR estimates will be used to differentiate the 0 or DTX from the case when 1/−1 or ACK/NAK are transmitted. The differentiation of 1 and −1, or ACK and NAK, may be done by checking the sign of the soft metric for E-RGCH or E-HICH.

Figure 7:
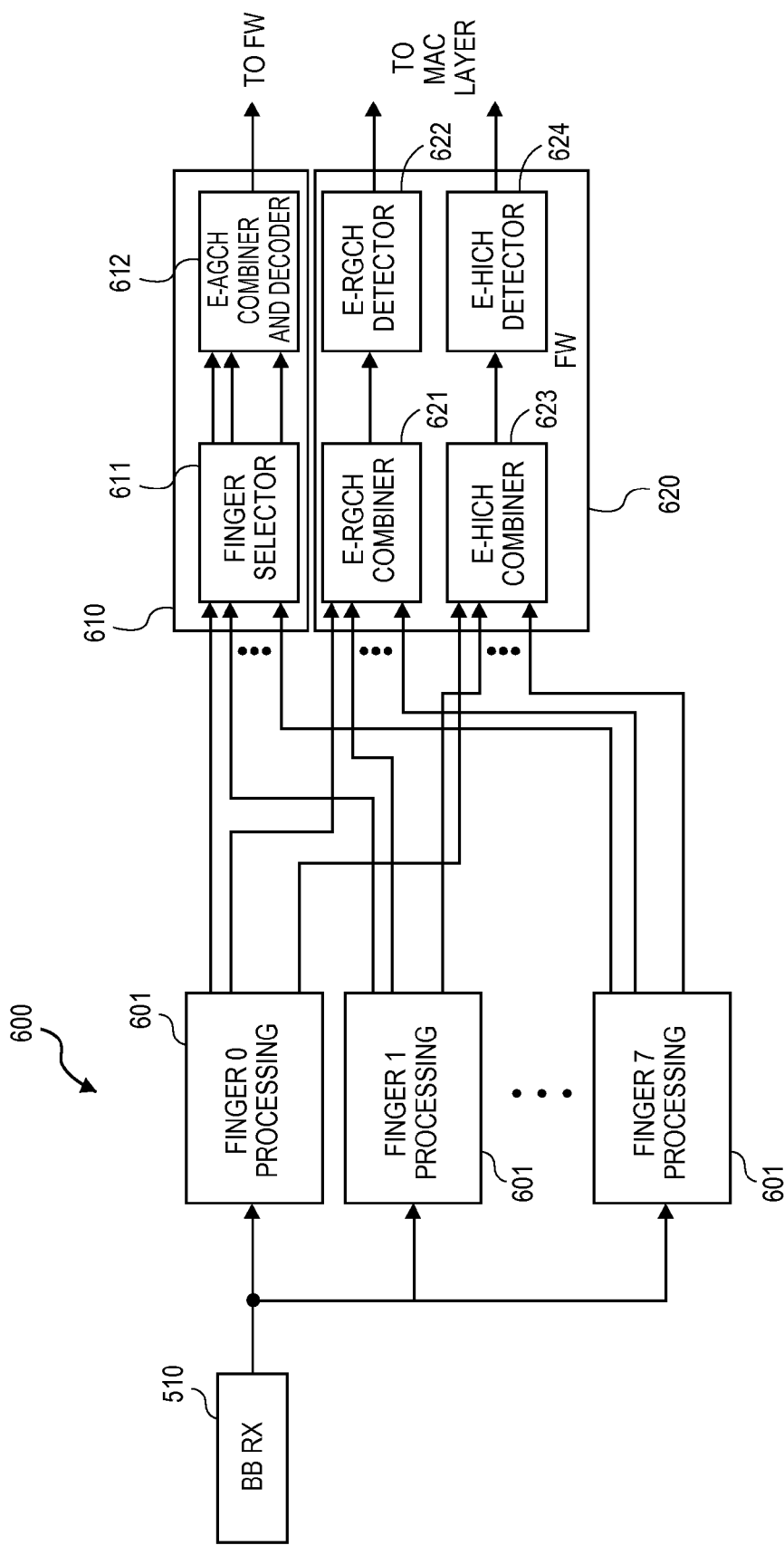
FIG. 7 is a block diagram of a portion of a wireless communication device that processes and detects E-AGCH, E-HICH and E-RGCH channels.

FIG. 7 shows one embodiment for the processing of the received signal past BB RX 510. Processing module 600 resides past BB RX 510 and includes one or more finger processing modules 601. Processing module 600 may be part of WCDMA processing module 520 or a combination of processing module 520 and firmware 521 of FIG. 6. In the example of FIG. 7, eight finger processing modules (0 through 7) are utilized to process multiple finger signals. Techniques for finger processing in wireless communications are generally known and a variety of techniques may be implemented to perform finger processing in modules 601. However, in this embodiment, modules 601 also includes portions of the present invention, as described below in reference to FIGS. 8-12. Module 600 also includes an E-AGCH processing module 610 and E-RGCH/E-HICH processing module 620. The outputs from finger processing modules 601 are coupled to respective inputs of E-AGCH processing module 610 and E-RGCH/E-HICH processing module 620.

E-AGCH processing module 610 includes a finger selection module 611 to select the appropriate finger(s) from modules 601 and E-AGCH combiner and decoder module 612 to combine and decode the finger outputs. A combined and decoded E-AGCH signal is output from E-AGCH processing module 610 for further processing to detect the control data for the absolute grant. In one embodiment, the E-AGCH processing module 610 is part of WCDMA processing module 520 and the output is sent to firmware 521.

E-RGCH/E-HICH processing module 620 includes an E-RGCH combiner 621 and E-RGCH detector 622 for E-RGCH finger combining and E-RGCH detection. Likewise E-RGCH/E-HICH processing module 620 includes an E-HICH combiner 623 and E-HICH detector 624 for E-HICH finger combining and E-HICH detection. In one embodiment, E-RGCH/E-HICH processing module 620 is part of firmware 521 and the E-HICH and E-RGCH outputs are sent to the Media Access Control (MAC) layer.

Figure 8:
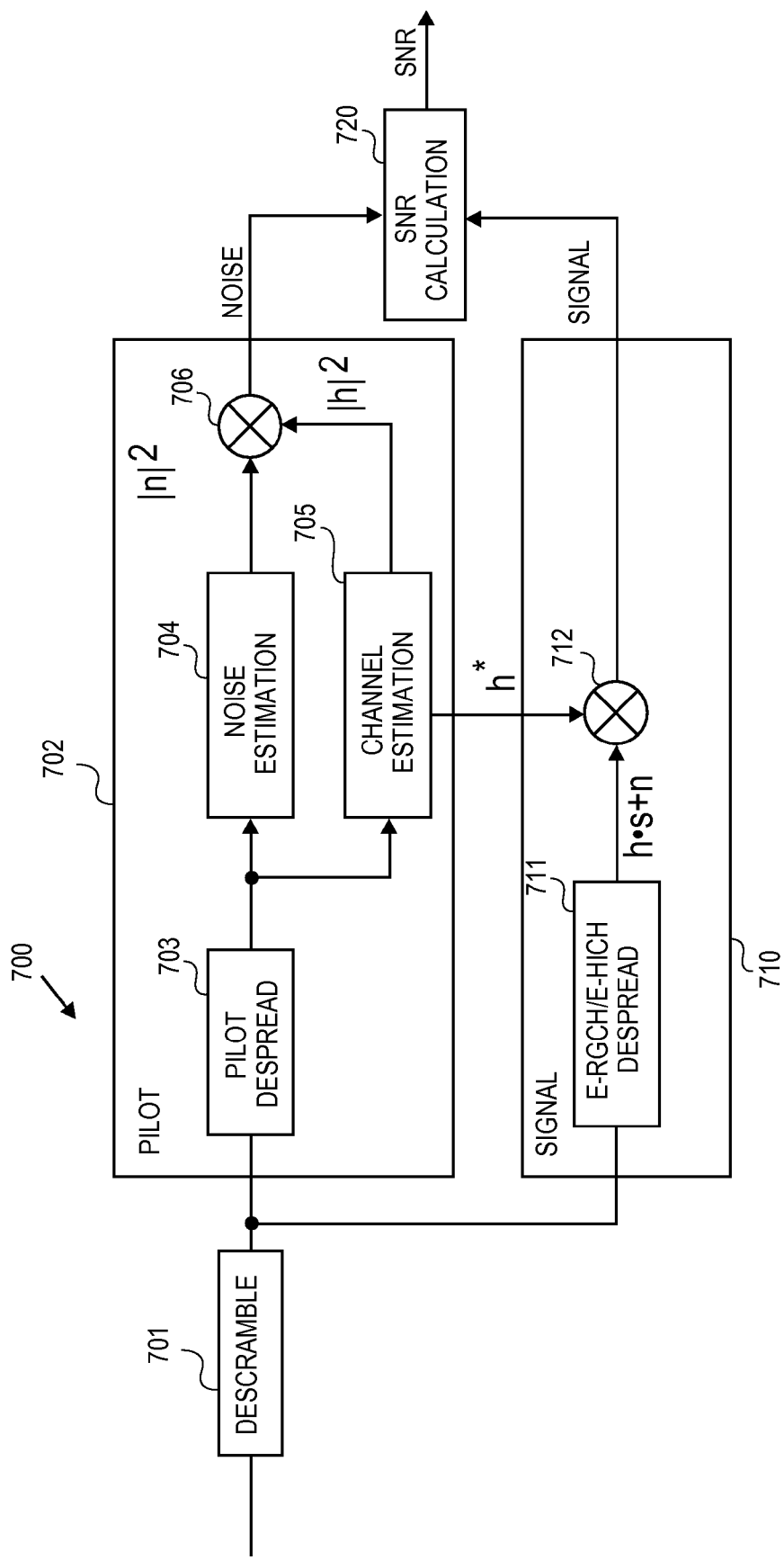
FIG. 8 is a block diagram showing one embodiment of the invention for detecting noise estimation from a received pilot channel and detecting a data signal from one of an orthogonally related channels to obtain a SNR value for the orthogonal channel.

FIG. 8 shows a processing module 700 to determine E-HICH/E-RGCH noise estimate component and data signal component, which are then used to calculate a signal-to-noise ratio (SNR) value. One instantiation of module 700 is utilized in each finger processing module 601 of FIG. 7 to determine E-HICH noise and signal components per finger and another set of instantiations of module 700 is utilized per finger processing module 601 to determine E-RGCH noise and signal components for each finger. The SNR calculation is performed in a SNR calculation module 720, which is part of E-HICH detector 624 (or E-RGCH detector 622), depending on which is being measured. The SNR calculation may be done by combining the signal power estimates from all active fingers to obtain the total signal power estimate, and by combining the noise power estimates from all active fingers to obtain the total noise power estimate. The SNR value is obtained by taking the ratio of total signal power estimate over the total noise power estimate. The SNR value is used as an indication of the E-HICH or E-RGCH power level so that a decision on 0 or DTX on E-RGCH or E-HICH may be obtained.

In one implementation, the SNR is compared to a pre-determined threshold, and if it exceeds the threshold, UE decides that 0 or DTX is not transmitted and move on to determine whether a 1 or −1 for E-RGCH, or ACK or NAK for E-HICH is transmitted. Otherwise, if the SNR does not exceed the pre-determined threshold, a 0 or DTX is declared. In case the SNR indicates 0 or DTX is not transmitted, the sign of the soft symbol (e.g. output from module 834 of FIG. 9) functions as a metric and may subsequently be used to determine on 1 or −1 for E-RGCH, or ACK and NAK for E-HICH.

FIG. 8 will be described below in reference to processing E-HICH, but it is to be noted that an equivalent technique is used to process E-RGCH. Two major processing blocks are noted in processing module 700. A pilot processing module 702 is used to derive a noise estimate component from a pilot signal, such as CPICH, and a signal processing module 710 is used to generate a soft symbol for E-HICH (or E-RGCH). This is done per finger. A descramble module 701 receives the output of BB RX 510 and descrambles CPICH, E-HICH and E-RGCH. CPICH is coupled to pilot processing module 702, while E-HICH (or E-RGCH) is coupled to data signal processing module 710. The term E-HICH/E-RGCH is used herein to designate that in one instance E-HICH is applicable when referring to E-HICH detection and in a separate instance E-RGCH is applicable when referring to E-RGCH detection. Typically separate modules are employed for respective E-HICH and E-RGCH detection.

In FIG. 8, a pilot despread module 703 despreads the pilot signal and the despread pilot signal is coupled to a noise estimation module 704. The despread pilot output is also coupled to a channel estimation module 705 to obtain channel estimation. Noise estimation of the pilot signal is provided in noise estimation module 704 and its output (noted as $\Sigma|n|^2$) is combined with a square of the channel estimation signal $|h|^2$ in multiplier 706 to generate a noise power estimation signal as an output from pilot processing module 702.

When CPICH is processed as the pilot signal, pilot processing module 703 processes CPICH that is used as the phase reference of E-HICH (or E-RGCH). The processing calculates the pre-channel-compensation noise power and the channel estimation power gain and uses them to compute the noise power estimate output over E-HICH (or E-RGCH).

On a parallel path, data signal processing module 710 receives the descrambled E-HICH (or E-RGCH) and despreads in E-RGCH/E-HICH despread module to generate a despread E-HICH (or E-RGCH), which is represented as [h·s+n]. Channel estimates derived from the pilot are also used by data signal processing module 710 and combined in multiplier 712 to compute the soft symbol for E-HICH (or E-RGCH). The channel estimate (h*) is used to derotate the despread symbol h·s+n, and the results are accumulated over the frame or subframe of the E-HICH or E-RGCH. The accumulated result is the soft symbol for the E-HICH or E-RGCH. The squared version, which may be represented as $||h|^2 s + h^* n|^2$, is then coupled to SNR calculation module 720 and operated on with the noise estimation output from module 702 to generate a SNR value for E-HICH (or E-RGCH).

Figure 9:
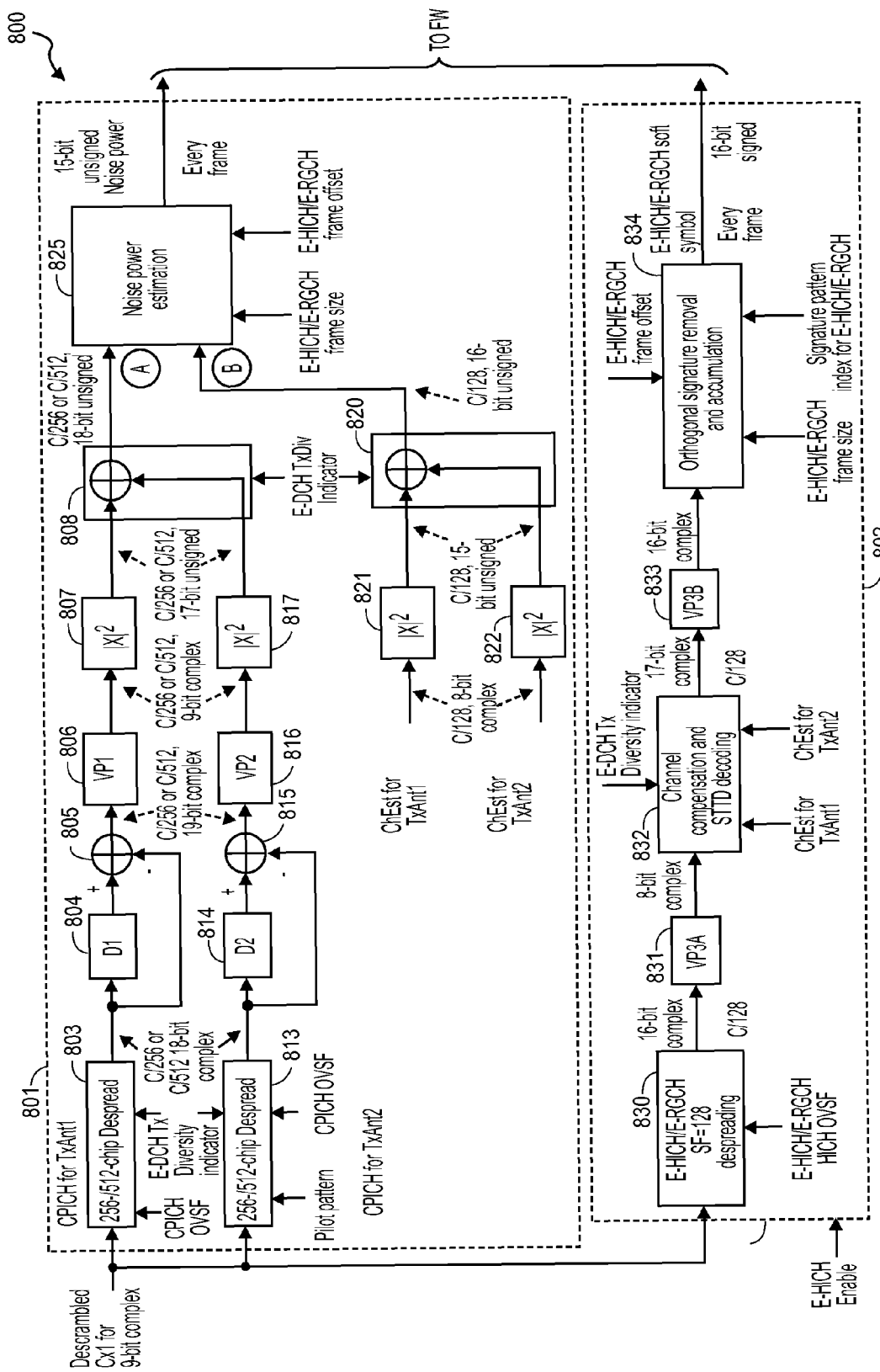
FIG. 9 is a more detailed block diagram of an embodiment of the device shown in FIG. 8 for detecting noise estimation from a CPICH channel and detecting E-HICH or E-RGCH to obtain a SNR value for E-HICH or E-RGCH.
Figure 10:
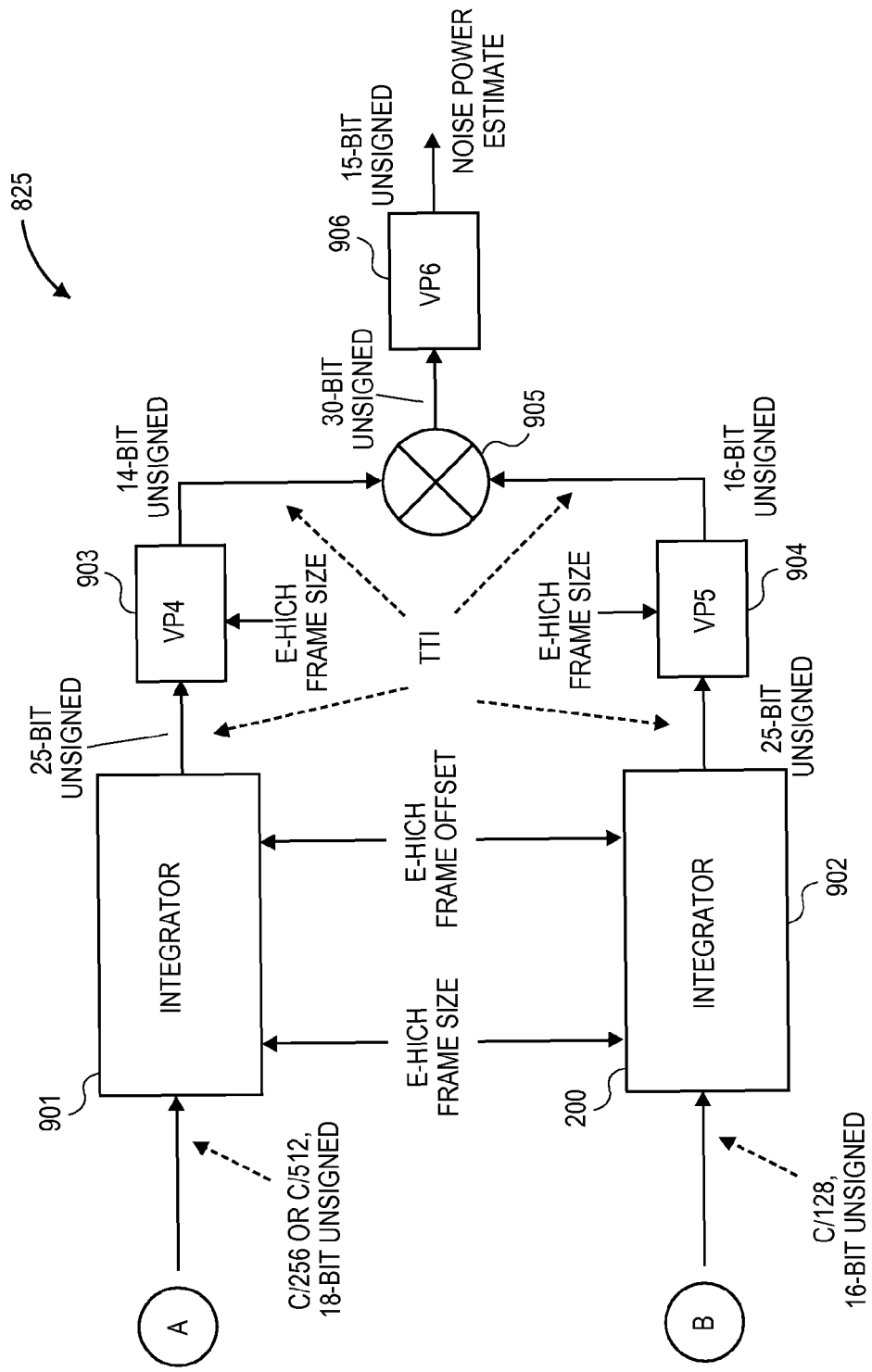
FIG. 10 is a block diagram showing one embodiment for implementing a noise power estimation module for the device shown in FIG. 9.
Figure 11:
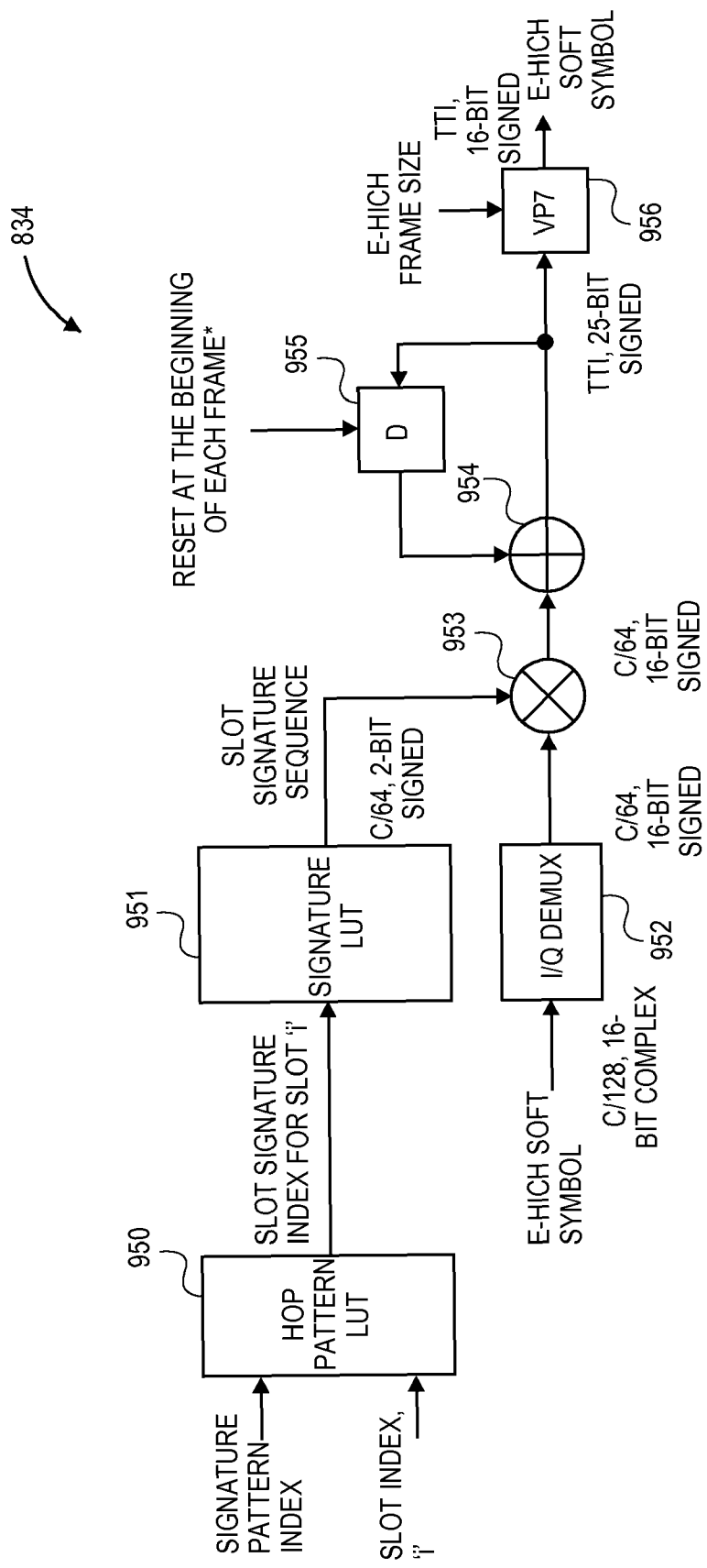
FIG. 11 is a block diagram showing one embodiment for implementing an orthogonal signature removal and accumulation module for the device shown in FIG. 9.

FIGS. 9-11 illustrate a more detailed diagram as one specific embodiment for implementing the two modules 702, 710 shown in FIG. 8, when applied to CPICH and E-HICH (or E-RGCH). CPICH processing module 801 is equivalent to pilot processing module 702 when the pilot signal is CPICH. Noise estimation is obtained from CPICH. Likewise, E-HICH/E-RGCH processing module 802 is equivalent to data signal processing module 710. Soft symbol for E-HICH (or E-RGCH) is obtained from module 802.

On the pre-channel compensation noise computation side provided by module 801, descrambled complex chip-rate (C×1) samples are despread to generate 256-chip or 512-chip symbols in despread modules 803 and 813. The leg with despread module 813 to process signals from a second antenna (antenna 2) is only used when transmit antenna diversity is used. 256-chip is used without antenna diversity, while 512-chip is used when antenna diversity is present. The despread is aligned with the CPICH frame boundary. Next, noise samples are obtained by taking the difference of the input 256-chip (or 512-chip) despread symbols in modules 804, 805 and 814, 815. Noise samples are then quantized by View Port (VP) modules 806 and 816 to bring down the bit width and squared in modules 807, 817. When transmit diversity exists, the output from module 817 is combined with the output from module 807 in summation module 808 before being sent to noise power estimation module 825.

On a parallel path, channel estimates that are used by the E-HICH (or E-RGCH) demodulation are used to compute the power gain from channel estimates on the E-HICH (or E-RGCH) channel in squaring modules 821 and 822 and summed in summation module 820 (when transmit diversity is present). As noted above, this channel estimate is the same channel estimate that is applied to E-HICH/E-RGCH data channel processing. The two inputs to noise power estimation module 825 are denoted as input A and input B.

Although a variety of noise power estimation techniques may be employed, one implementation of noise power estimation module 825 is shown in FIG. 10. The pre-channel-compensation noise power and channel power are averaged over the frame duration for the E-HICH (or E-RGCH) frame being processed in integrators 901 and 902, respectively. Time alignment with the current E-HICH (or E-RGCH) frame is to be maintained for proper accuracy. The accumulated results are then sent to VP modules 903, 904, respectively, at the end of the E-HICH (or E-RGCH) frame. The VP4 and VP5 settings are dependent on the E-HICH (or E-RGCH) frame size. The outputs of modules 903, 904 are multiplied and quantized in multiplier module 905 and VP 906 to generate the noise power estimate output, which in this instance is provided to the firmware, such as firmware 521 of FIG. 6. It is to be noted that diagram of power estimation module 825 in FIG. 10 references E-HICH. When E-RGCH is processed, an equivalent module is used with E-RGCH substituted for E-HICH in the drawings.

Referring again to FIG. 9, E-HICH/E-RGCH processing module 802 located at the lower portion of the drawing provides the E-HICH (or E-RGCH) processing path for the particular finger. The descrambled samples are despread by E-HICH/E-RGCH despreading module 830 to generate 128-chip symbols. The despread symbols are then quantized by VP module 831 and sent to channel compensation and STTD (Space Time Transit Diversity) decoding module 832 if transmit diversity is used. The output of module 832 is quantized by VP module 833 and sent to orthogonal signature removal and accumulation module 834.

Although a variety of orthogonal signature removal and accumulation techniques may be employed, one implementation of orthogonal signature removal and accumulation module 834 is shown in FIG. 11. The E-HICH (or E-RGCH) input data is first passed through an I/Q (In-phase/Quadrature) demultiplexer module 952 to convert the complex symbol into real symbols. The converted data is then multiplied by an orthogonal slot signature sequence, which is obtained via hop pattern look-up table 950 and signature look-up-table 951. The multiplication is performed in multiplier 953. The orthogonal signature sequence generation generally follows a procedure outlined in the 3GPP standard. After the signature removal, the data is accumulated over the E-HICH (or E-RGCH) frame. The accumulation is an integrate and dump operation performed by summation and dump modules 954, 955. The integrate and dump operation is achieved in which the block starts the accumulation from the beginning of the E-HICH (or E-RGCH) frame and dumps the result after the last value of the same E-HICH (or E-RGCH) frame is accumulated. The accumulated result is further quantized by VP module 956 to generate the E-HICH (or E-RGCH) soft symbol from module 802.

The outputs from modules 801 and 802 are then used to calculate the SNR for the E-HICH or E-RGCH, depending on which of the two is being detected. In addition, the output of module 802 is signed and the sign is used to determine if 1 or −1 is transmitted for E-RGCH, or ACK or NAK is transmitted for E-HICH. As noted, the techniques for obtaining the signal and noise components for E-RGCH are essentially equivalent to the techniques for obtaining the signal and noise components for E-HICH. The noise power estimate and E-HICH/E-RGCH soft symbols are then used to calculate a respective SNR value for E-HICH/E-RGCH, such as by use of SNR calculation module of 720 of FIG. 8. In the example of FIG. 9, the noise power estimate and E-HICH/E-RGCH soft symbol are sent to firmware (FW) and the function of SNR calculation module 720 is provided by firmware, such as module 620 of FIG. 7.

Accordingly, E-HICH and/or E-RGCH processing, metric estimation and detection may be performed individually to obtain a signal power level for the respective channel, while a pilot signal portion that maintains proper time alignment with E-HICH/E-RGCH also undergoes a similar technique to obtain a noise power estimate, so that a SNR value may be obtained from the two to ascertain the true power level for each of E-HICH and E-RGCH.

Figure 12:
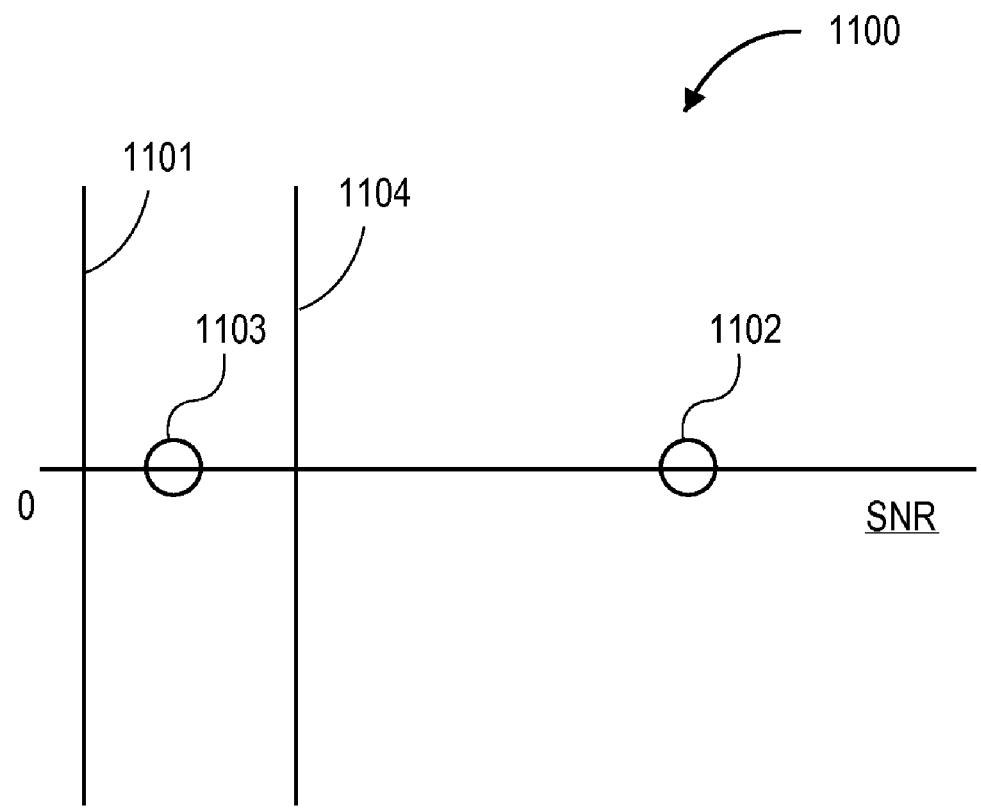
FIG. 12 is an example diagram showing a final detection step for detecting signals for the orthogonal channels E-HICH/E-RGCH.

In FIG. 12, diagram 1100 illustrates a technique of determining the DTX or 0 based on the SNR estimation. SNR is in the range from 0 (left of line 1101) to some maximum value allowed by the SNR representation, which in the specific implementation is limited by the data bitwidth that is used to represent the SNR. A threshold value (or level) 1104 is set and the SNR is compared to this threshold value 1104. If the SNR exceeds the threshold, as shown by location 1102 which resides to the right of the threshold 1104, then the signal is present and the sign of the soft metric (referred to as sign metric herein) is further used to determine whether it is a 1/−1 or ACK/NAK. If the SNR does not exceed the threshold value 1104, as shown by location 1103 to the left of the threshold 1104, then the signal is deemed not present and, hence, a 0 value. The SNR threshold detection, as well as the sign metric detection when the SNR threshold is exceeded, may be performed in the SNR calculation module 720, in another processing module, firmware, or by some other module or component.

Accordingly, E-HICH/E-RGCH processing, metric estimation and detection is described.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items.

Furthermore, the term "module" is used herein to describe a functional block and may represent hardware, software, firmware, etc., without limitation to its structure. A "module" may be a circuit, integrated circuit chip or chips, assembly or other component configurations. Accordingly, a "processing module" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions and such processing device may have accompanying memory. A "module" may also be software or software operating in conjunction with hardware.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. Similarly, flow diagram blocks and methods of practicing the embodiments of the invention may also have been arbitrarily defined herein to illustrate certain significant functionality. To the extent used, the flow diagram block boundaries and methods could have been defined otherwise and still perform the certain significant functionality. Such alternate definitions of functional building blocks, flow diagram blocks and methods are thus within the scope and spirit of the claimed embodiments of the invention. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. An apparatus comprising:
    a pilot processing module to combine channel estimation power with estimated noise power from a pilot channel to obtain a combined noise power estimation;
    a signal processing module to obtain signal power estimation of a first signal channel separately from a second signal channel that is orthogonal to the first signal channel, the first signal channel aligned with the pilot channel; and
    a signal-to-noise (SNR) calculation module to determine a SNR value from the combined noise power estimation and the signal power estimation.

2. The apparatus of claim 1, wherein the pilot channel and the first signal channel are averaged over a same frame duration to obtain the combined noise power estimation and the signal power estimation, respectively.

3. The apparatus of claim 1, wherein the SNR value is compared with a threshold value and when the SNR value exceeds the threshold value, a sign of a soft metric of the first signal channel is detected.

4. The apparatus of claim 3 wherein the pilot channel and the first signal channel are downlink dedicated channels defined in a $3^{rd}$ Generation Partnership Project standard specification.

5. The apparatus of claim 3 wherein when the first signal channel carries an acknowledge (ACK) or no acknowledge (NAK) indication, the SNR value identifies a presence of the ACK or NAK indication when the SNR value is above the threshold value and which of the ACK or NAK indication is present is determined by a corresponding sign value of the soft metric of the first signal channel.

6. The apparatus of claim 3 wherein when the first signal channel carries an increment or decrement indication for incrementing or decrementing a transmitting power limit, the SNR value identifies a presence of the increment or decrement indication when the SNR value is above the threshold value and which of the increment or decrement indication is present is determined by a corresponding sign value of the soft metric of the first signal channel.

7. The apparatus of claim 1, wherein the pilot processing module utilizes one pilot signal processing path to obtain the combined noise power estimation when receiving a non-diversity signal and utilizes multiple pilot signal processing paths when receiving a diversity signal to process pilot channels separately, in which power estimations from the multiple paths are subsequently combined with multiple channel estimation power to obtain the combined noise power estimation.

8. An apparatus comprising:
    a pilot processing module to combine channel estimation power with estimated noise power from a pilot channel to obtain a combined noise power estimation;
    a signal processing module to obtain signal power estimation of a first signal channel separately from a second signal channel that is orthogonal to the first signal channel, the first signal channel aligned with the pilot channel and in which the pilot channel and the first signal channel are averaged over a same frame duration to obtain the noise power estimation and the signal power level, respectively; and
    a signal-to-noise (SNR) calculation module to determine a first SNR value from the combined noise power estimation and the signal power estimation, and to generate a soft metric corresponding to a component present in the first signal.

9. The apparatus of claim 8 further including a second signal processing module to receive the second signal channel separately from the first signal channel, the pilot channel aligned to average over a same frame duration as the second signal channel to obtain a second signal power estimation.

10. The apparatus of claim 9 further including a second signal-to-noise (SNR) calculation module to determine a second SNR value from a second combined noise power estimation and the second signal power estimation.

11. The apparatus of claim 10 wherein the first signal channel is E-HICH and the second signal channel is E-RGCH as defined in a $3^{rd}$ Generation Partnership Project standard specification.

12. The apparatus of claim 11 wherein the pilot channel is CPICH as defined in a $3^{rd}$ Generation Partnership Project standard specification.

13. The apparatus of claim 10 wherein when the first signal channel carries an acknowledge (ACK) or no acknowledge (NAK) indication, the first SNR value identifies a presence of the ACK or NAK indication when the first SNR value is above a first threshold value and which of the ACK or NAK indication is present is detected by a corresponding sign value of the soft metric corresponding to the first signal channel.

14. The apparatus of claim 13 wherein when the second signal channel carries an increment or decrement indication for incrementing or decrementing transmitting power limit, the second SNR value identifies a presence of the increment or decrement indication when the second SNR value is above a second threshold value and which of the increment or decrement indication is present is detected by a corresponding sign value of a soft metric corresponding to the second signal.

15. The apparatus of claim 8, wherein the pilot processing module utilizes one pilot signal processing path to obtain the combined noise power estimation when receiving a non-diversity signal and utilizes multiple pilot signal processing paths when receiving a diversity signal to process pilot channels separately, in which power estimations from the multiple paths are subsequently combined with multiple channel estimation power to obtain the combined noise power estimation.

16. Method comprising:
processing a received pilot channel to combine channel estimation power with estimated noise power to obtain a combined noise power estimation;
processing a received first signal channel, separately from a second signal channel that is orthogonal to the first signal channel, to obtain signal power estimation of the first signal channel, the first signal channel aligned with the pilot channel; and
determining a signal-to-noise (SNR) calculation value from the combined noise power estimation and the signal power estimation.

17. The method of claim 16 further including averaging the pilot channel and the first signal channel over a same frame duration to obtain the combined noise power estimation and the signal power estimation, respectively.

18. The method claim 17 further including comparing the SNR value with a threshold value and when the SNR value exceeds the threshold value, detecting a sign of a soft metric of the first signal channel.

19. The method of claim 18 further including determining if the SNR value exceeds the threshold value to indicate that the first signal channel carries an acknowledge (ACK) or no acknowledge (NAK) indication, and when the SNR value identifies a presence of the ACK or NAK indication, determining which of the ACK or NAK indication is present by detecting a corresponding sign value of the soft metric of the first signal channel.

20. The method of claim 18 further including determining if the SNR value exceeds the threshold value to indicate that the first signal channel carries an increment or decrement indication for incrementing or decrementing a transmitting power limit, and when the SNR value identifies a presence of the increment or decrement indication, determining which of the increment or decrement indication is present by detecting a corresponding sign value of the soft metric of the first signal channel.

* * * * *